US007137115B2

(12) United States Patent
Sakamoto et al.

(10) Patent No.: US 7,137,115 B2
(45) Date of Patent: Nov. 14, 2006

(54) METHOD FOR CONTROLLING MULTITHREADING

(75) Inventors: Satoshi Sakamoto, Kawasaki (JP); Masanori Iwazaki, Kawasaki (JP); Akira Tsuboi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 579 days.

(21) Appl. No.: 09/748,862

(22) Filed: Dec. 28, 2000

(65) Prior Publication Data

US 2001/0010052 A1    Jul. 26, 2001

(30) Foreign Application Priority Data

Jan. 25, 2000    (JP)    ............................. 2000-016070

(51) Int. Cl.
*G06F 9/46*    (2006.01)
(52) U.S. Cl. .................... 718/102; 718/104; 718/105; 718/106; 709/201; 709/225
(58) Field of Classification Search ........ 718/100–108; 709/201, 225
See application file for complete search history.

(56) References Cited

U.S. PATENT DOCUMENTS

| | | | | |
|---|---|---|---|---|
| 5,835,763 A | * | 11/1998 | Klein ......................... | 718/101 |
| 5,991,792 A | * | 11/1999 | Nageswaran ................ | 718/102 |
| 6,182,109 B1 | * | 1/2001 | Sharma et al. .............. | 718/104 |
| 6,389,446 B1 | * | 5/2002 | Torii .......................... | 718/100 |
| 6,427,161 B1 | * | 7/2002 | LiVecchi ..................... | 718/102 |
| 6,477,561 B1 | * | 11/2002 | Robsman ..................... | 718/105 |
| 6,487,578 B1 | * | 11/2002 | Ranganathan ................ | 718/104 |
| 6,505,229 B1 | * | 1/2003 | Turner et al. ................ | 718/107 |
| 6,629,142 B1 | * | 9/2003 | Badami et al. ............. | 709/225 |
| 6,769,121 B1 | * | 7/2004 | Koyama et al. ............. | 718/100 |
| 6,898,617 B1 | * | 5/2005 | Doolittle et al. ............ | 709/201 |
| 2004/0139434 A1 | * | 7/2004 | Blythe et al. ................ | 718/100 |

FOREIGN PATENT DOCUMENTS

| | | | |
|---|---|---|---|
| DE | EP 0 697 653 | * | 10/1995 |
| JP | 3-40034 | | 2/1991 |
| JP | A 10 124331 | | 5/1998 |

OTHER PUBLICATIONS

Control of Dynamic Threads Pool for Concurrent Remote Procedure Calls, IBM Technical Disclosure Bulletin, vol. 38, No. 5, pp. 199-200 (May 1995).*
Japanese Office Action dated Mar. 7, 2006 issued in corresponding Japanese Patent Application No. 2001-014611.

* cited by examiner

*Primary Examiner*—Meng-Ai T. An
*Assistant Examiner*—Jennifer N. To
(74) *Attorney, Agent, or Firm*—Staas & Halsey LLP (57) ABSTRACT

A method for controlling parallel threads such that the speed of running programs increases and system resources are used efficiently. The method includes monitoring a number of running threads performing parallel processing and a number of standby threads that are in a standby state, and terminating standby threads in accordance with the number of the running threads and the number of the standby threads.

9 Claims, 5 Drawing Sheets

METHOD FOR CONTROLLING MULTITHREADING

BACKGROUND OF THE INVENTION

The present invention relates to multithreading, and more particularly, to a method for controlling multithreading in a system that performs parallel processing with multiple threads so as to increase the speed of programs and efficiently use system resources.

In a system that executes programs, such as scientific calculations, threads are used to perform parallel processing. This increases the speed of programs. An operating system (OS) program generates threads in accordance with application programs. The OS allocates system resources to each of the generated threads and runs programs associated with the threads in a parallel manner.

It takes time for the OS to generate a thread. Thus, once a thread is generated, the thread remains undeleted so that it can be used again. This increases the system processing speed.

In more detail, when a thread completes execution of a program, the OS registers the thread as a standby thread in a table. Then, if there is a request for generating the thread, the standby thread registered in the table is used to run a program. This decreases the time for generating threads.

In the prior art, all of the generated threads are managed as standby threads. Thus, if the number of the running threads that are actually running is small, the system would have a large number of unnecessary standby threads. This wastes memory resources since system resources are allocated to the standby threads.

For example, if 200 parallel threads are run at a certain time, and then only two threads are run at a later time, 198 unnecessary standby threads would be occupying the memory. This is undesirable when operating a system that has low resources and would significantly affect the speed of other programs.

SUMMARY OF THE INVENTION

It is an object of the present invention to provide a method for controlling multithreading that increases the speed of running programs and uses system resources efficiently.

To achieve the above object, the present invention provides a method for controlling a plurality of threads that perform parallel processing. The method includes monitoring a number of running threads performing parallel processing and a number of standby threads that are in a standby state, and terminating standby threads in accordance with the number of the running threads and the number of the standby threads.

The present invention also provides a controller for controlling a plurality of threads that perform parallel processing. The controller includes a thread management table for storing thread information of the plurality of threads. The thread information includes a number of running threads performing parallel processing and a number of standby threads that are in a standby state. Based on the number of the standby threads stored in the thread management table, a thread management circuit requests thread generation and a standby thread to run. A thread termination circuit terminates standby threads in accordance with the number of the running threads and the number of the standby threads stored in the thread management table.

The present invention further provides a computer readable storage medium storing a program for controlling a plurality of threads that perform parallel processing. The program performs a method including monitoring a number of running threads performing parallel processing and a number of standby threads that are in a standby state, and terminating standby threads in accordance with the number of the running threads and the number of the standby threads.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
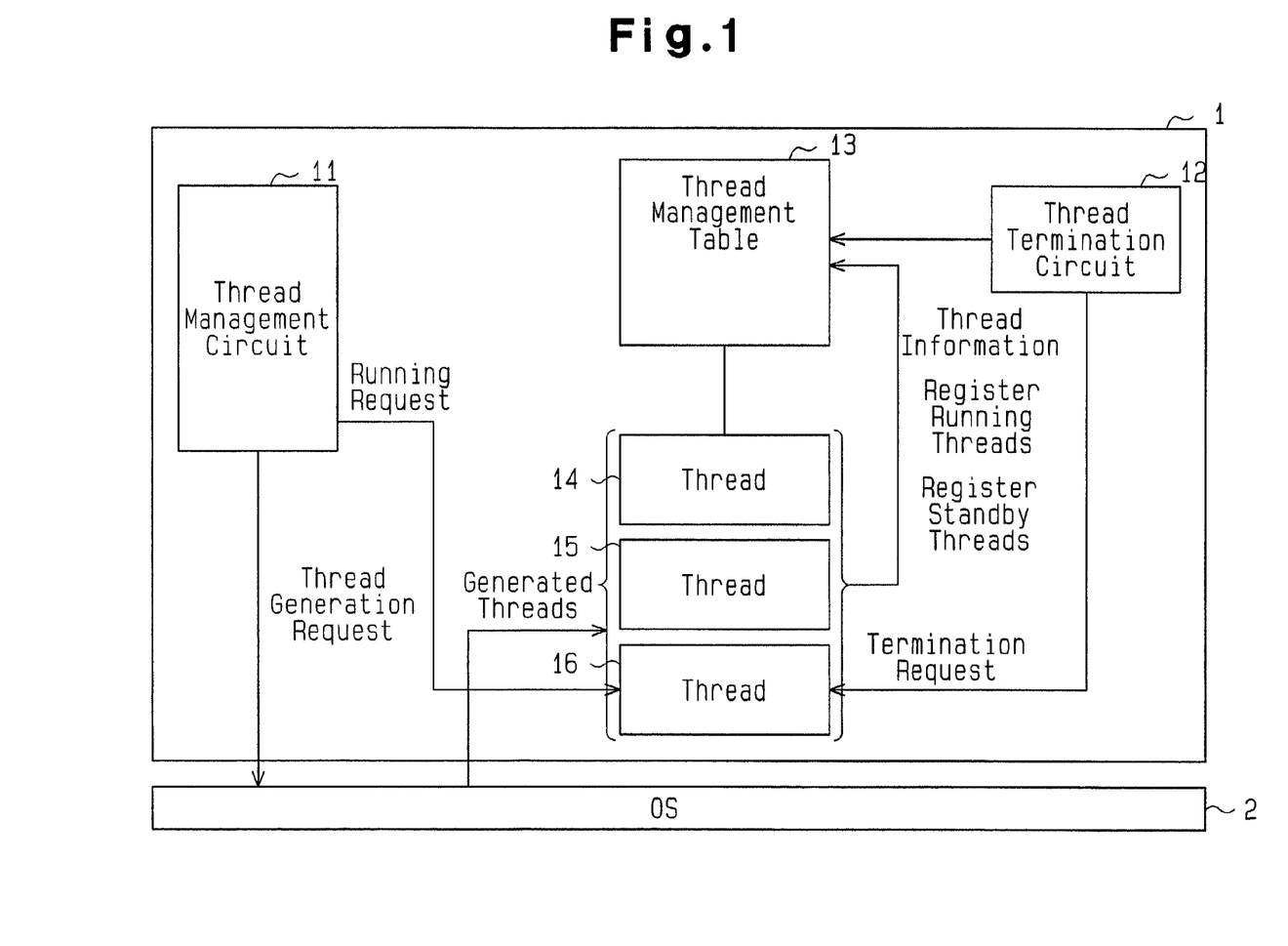
FIG. 1 is a schematic block diagram of a multithreading controller according to a preferred embodiment of the present invention.

FIG. 1 is a schematic block diagram of a multithreading controller 1 according to a preferred embodiment of the present invention. The multithreading controller 1 is incorporated in a system (computer), which runs application programs, and requests an operating system (OS) 2 to generate threads. The controller 1 uses the generated threads to run program sections (e.g., DO loop or subroutines) in parallel.

When a thread completes running a program section, the multithreading controller 1 registers the thread as a standby thread. Subsequently, when there is a request to perform the program section, the multithread controller 1 searches for the corresponding standby thread and, when finding the desired standby thread, runs the program section with the standby thread. If the desired standby thread is not found, the controller 1 requests the OS 2 to generate a thread.

The multithreading controller 1 monitors the number of threads that are running program sections (hereafter referred to as running thread number) and the number of standby threads (hereafter referred to as standby thread number). The multithreading controller 1 terminates the surplus standby threads when the standby thread number exceeds the number of necessary standby threads relative to the running thread number. The multithreading controller 1 terminates standby threads based on, for example, a maximum running thread number and the standby thread number.

In more detail, the multithreading controller 1 monitors the running thread number for a predetermined time period, and sets the necessary number of standby threads to the maximum value of the running thread number (maximum running thread number) taken during the time period. Then, the multithreading controller 1 compares the maximum running thread number with the currently managed number of standby threads. If the standby thread number is greater than the maximum running thread number, the multithreading controller 1 terminates the excessive standby threads. In other words, the multithreading controller 1 decreases the standby thread number until it matches the maximum running thread number.

In this manner, the multithreading controller 1 decreases the standby threads that are using the system resources in a wasteful manner. Thus, the running threads are unaffected by surplus standby threads.

The maximum running thread number varies in accordance with the operational state of the system. Hence, by terminating standby threads in accordance with changes in the maximum running thread number, the standby threads are managed at an optimal number with respect to the operational state.

Since the number of standby threads correspond to the maximum running thread number, which is obtained by monitoring the running thread number over a predetermined time period, sudden increases in the number of threads can be handled. That is, even if the running thread number decreases momentarily, a number of standby threads corresponding to the maximum running thread number are stored. This avoids the termination of too many standby threads and enables programs to run immediately.

The structure of the multithreading controller will now be discussed.

The multithreading controller 1 includes a thread management circuit 11, a thread termination circuit 12, and a thread management table 13.

The thread management circuit 11 requests the OS 2 to generate a thread and requests a thread to run a program. The thread termination circuit 12 monitors the standby threads and deletes surplus standby threads.

Three threads 14, 15, 16, which have been generated by the OS 2, are illustrated in FIG. 1. The first two threads 14, 15 are running threads, which run programs, and the third thread 16 is a standby thread, which has completed a program.

Figure 2:
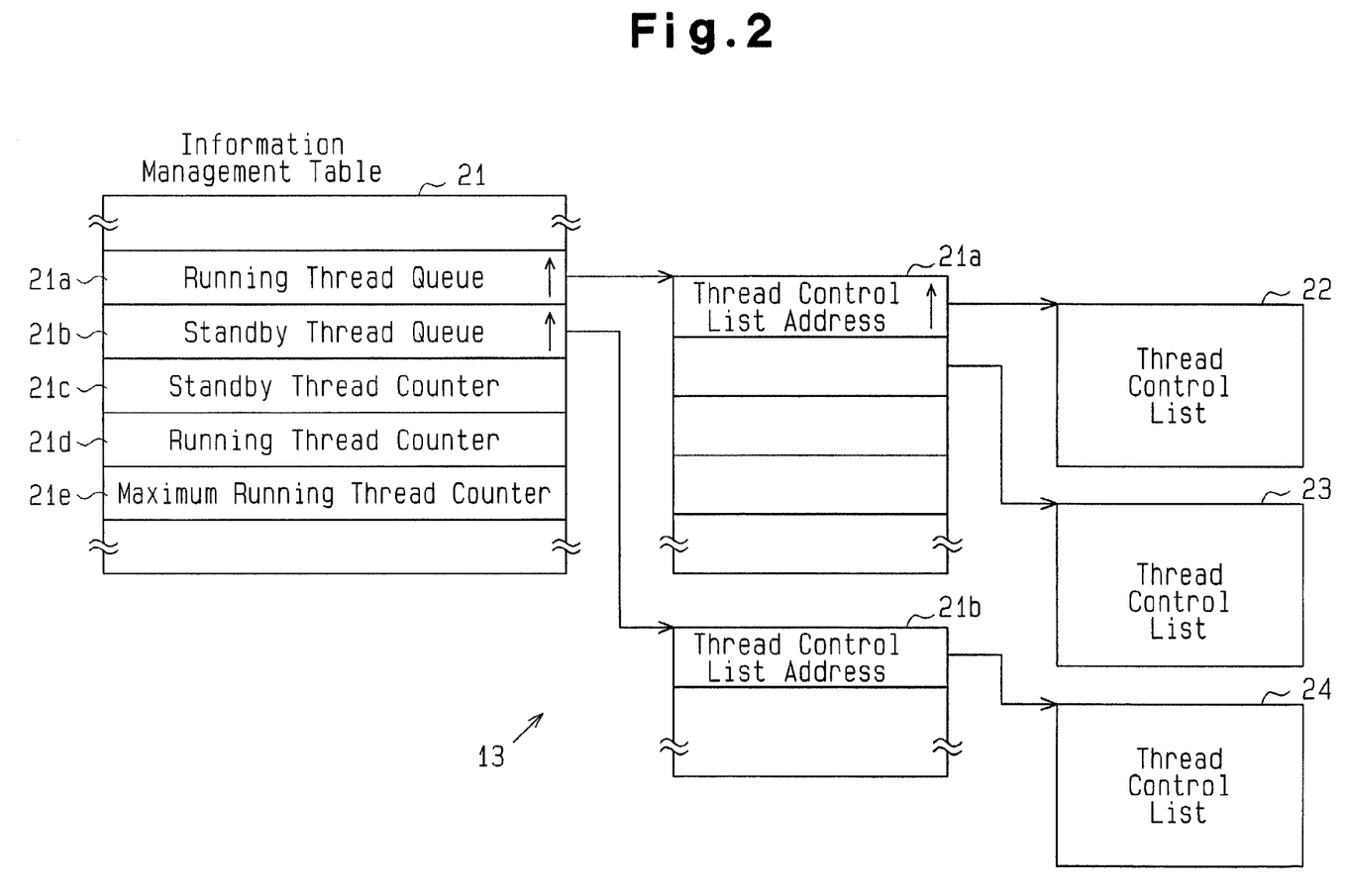
FIG. 2 is a schematic diagram of a thread management table of the multithreading controller of FIG. 1.

FIG. 2 is a schematic diagram of the thread management table 13. The thread management table 13 includes an information management table 21 and a plurality (three in association with the threads 14 to 16 in FIG. 1) of thread control lists 22, 23, 24. The information management table 21 has a running thread queue section 21a, a standby thread queue section 21b, a standby thread counter section 21c, a running thread counter section 21d, and a maximum running thread counter section 21e.

The running thread queue section 21a stores addresses of the thread control table lists that correspond to the queued running threads. Further, the running thread queue section 21a manages information concerning the running threads.

The standby thread queue section 21b stores addresses of the thread control table lists that correspond to the queued standby threads. Further, the standby thread queue section 21b manages information concerning the standby threads. Accordingly, the running thread queue section 21a records the addresses of the thread control lists 22, 23 associated with the running threads 14, 15, and the standby thread queue section 21b records the address of the thread control list 24 associated with the standby thread 16.

Figure 3:
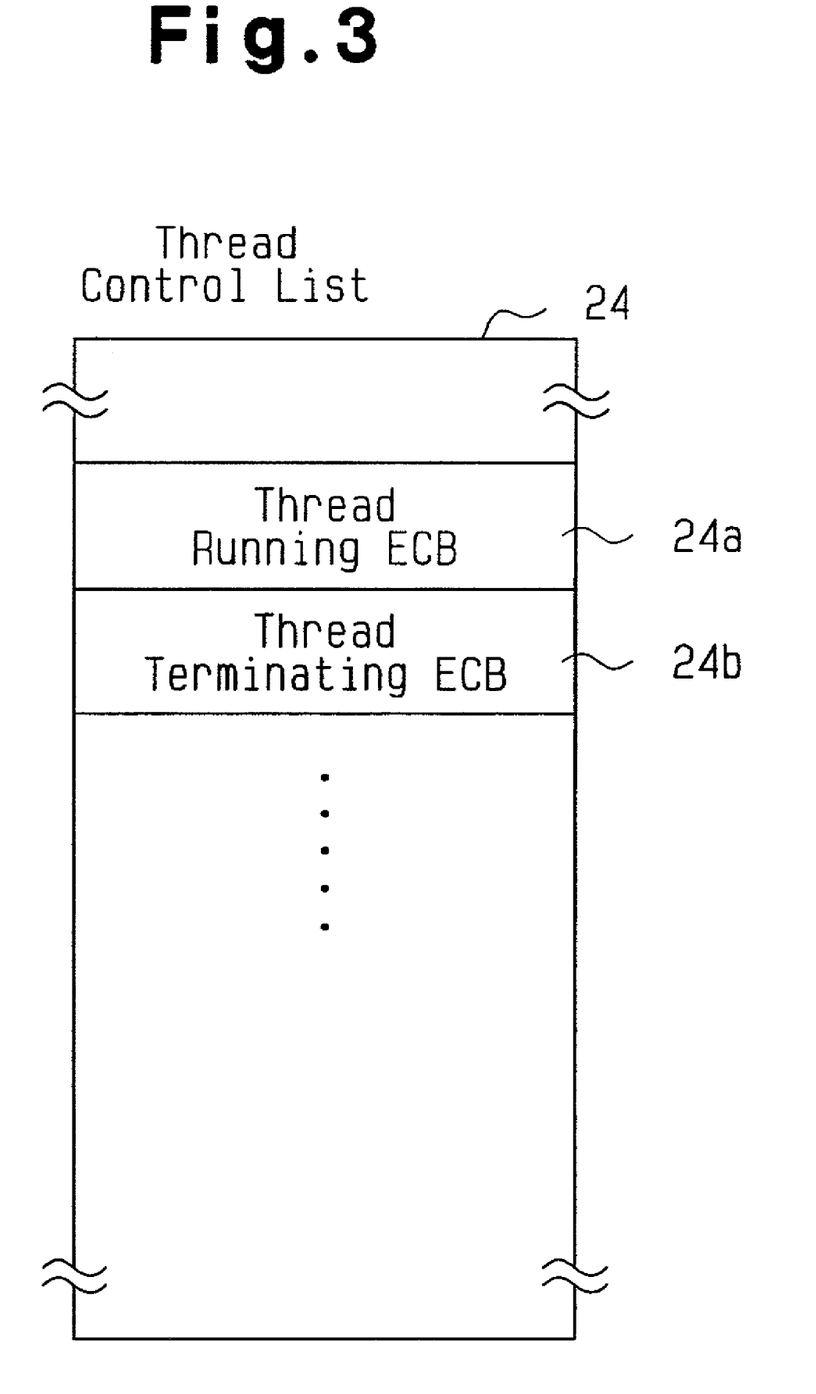
FIG. 3 is an explanatory diagram of a thread control list of the thread management table of FIG. 2.

FIG. 3 is an explanatory diagram illustrating the structure of the thread control list 24. The other thread control lists 22, 23 have a structure similar to the thread control list 24 and will thus not be discussed.

The thread control list 24 includes a thread running event control block (ECB) 24a and a thread terminating ECB 24b. The thread running ECB 24a manages the requests received from the thread management circuit 11. The thread terminating ECB 24b manages termination requests received from the thread termination circuit 12 of FIG. 1. The standby thread 16 runs or stops a program in accordance with information written to the ECBs 24a, 24b.

The thread management circuit 11 stores a run request in the thread running ECB 24a of the thread control list 24 associated with the standby thread queue section 21b. When the run request stored in the thread running ECB 24a is associated with the standby thread 16, the standby thread 16 runs the program associated with the standby thread 16 in accordance with the information.

The thread termination circuit 12 stores a termination request in the thread terminating ECB 24b of the thread control list 24 associated with the standby thread queue section 21b. When the termination request stored in the thread terminating ECB 24b is associated with the standby thread 16, the standby thread 16 is terminated. This frees the system resources that were allocated to the standby thread 16.

The standby thread counter section 21c stores the number of standby threads counted by a standby thread counter (not shown). The running thread counter section 21d stores the number of running threads counted by a running thread counter (not shown). The maximum running thread counter section 21e stores a maximum value of the number of running threads counted by a maximum running thread counter (not shown).

When the running threads 14, 15 complete the associated programs, the running thread counter decrements by one the value of the running thread counter section 21d for each of the running threads 14, 15. Further, the standby thread counter increments by one the value of the standby thread counter section 21c for each of the running threads 14, 15.

When the standby thread 16 receives a run request from the thread management circuit 11, the value of the standby thread counter section 21c is decremented by one, and the value of the running thread counter section 21d is incremented by one. If the value of the running thread counter section 21d is greater than that of the maximum running thread counter section 21e, the standby thread 16 updates the value of the maximum running thread counter section 21e to the value of the running thread counter section 21d.

The thread management circuit 11 requests the generation or running of a thread based on the data of the standby thread counter section 21c. More specifically, when the thread management circuit 11 receives a request for running a parallel program, the thread management circuit 11 requests the OS 2 to generate a thread if the value of the standby thread counter section 21c is null. The thread management circuit 11 queues the generated thread in the running thread queue section 21a and requests the thread to run a program. If the value of the standby thread counter section 21c is one or greater, the thread management circuit 11 requests the standby thread 16 queued in the standby thread queue section 21b to run a program.

Based on the values of the standby thread counter section 21c and the maximum running thread counter section 21e, the thread termination circuit 12 deletes surplus threads. In other words, the thread termination circuit 12 monitors the maximum running thread counter section 21e and the standby thread counter section 21c at predetermined time intervals and compares the values of the two counter sections 21c, 21e. If the value of the standby thread counter section 21c is greater than that of the maximum running thread counter section 21e, the thread termination circuit 12 terminates the standby threads until the number of the standby threads becomes equal to the value of the maximum running thread counter section 21e. More specifically, the thread termination circuit 12 requests termination of a number of standby threads exceeding the value of the maximum running thread counter section to recover system resources.

Figure 4:
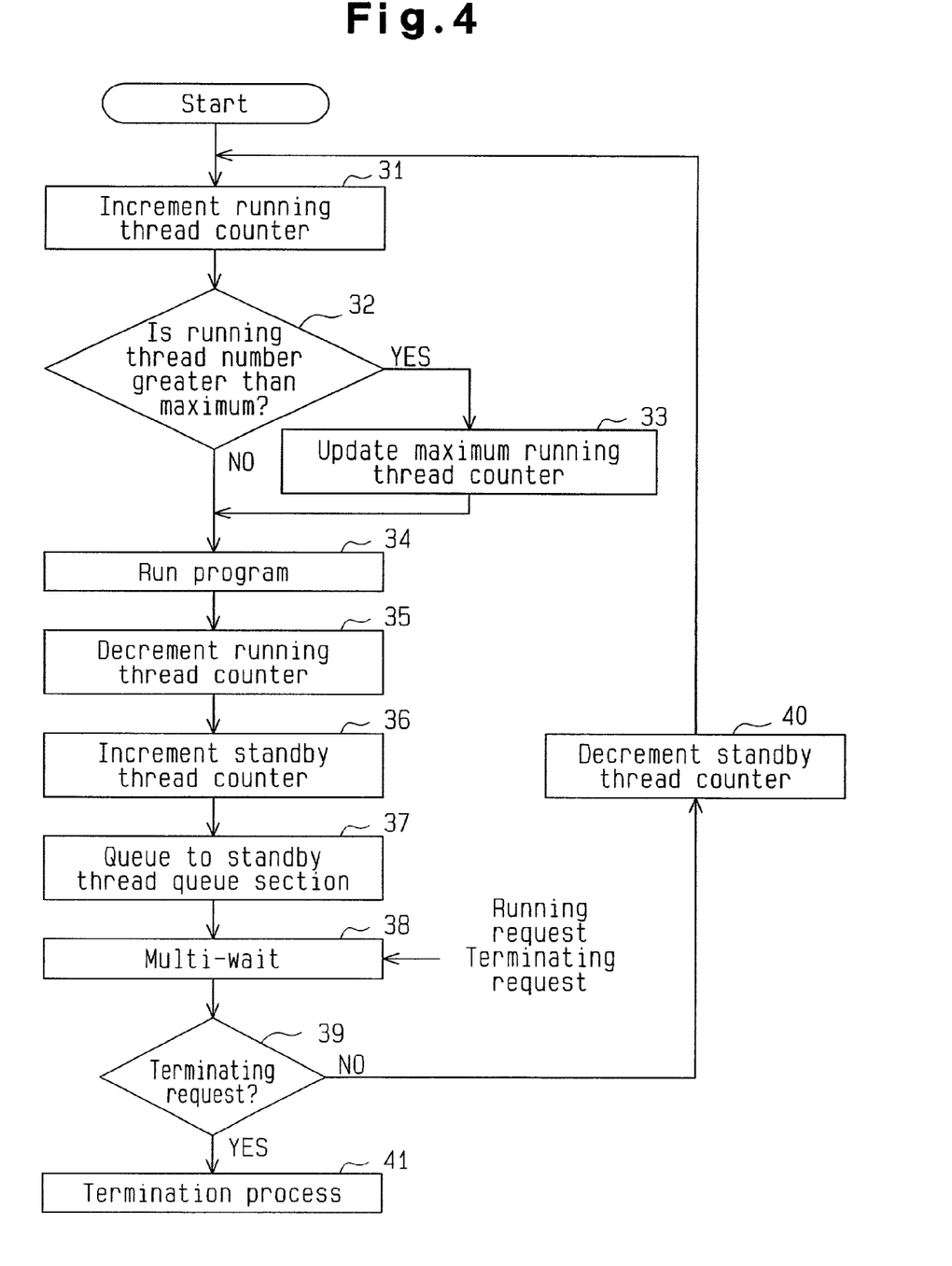
FIG. 4 is a flowchart illustrating a routine for processing threads.

The operation of the threads 14 to 16 and the thread termination circuit 12 will now be discussed. FIG. 4 is a flowchart illustrating a routine performed by a thread (running thread or standby thread).

When entering the routine, at step S31, the thread first increments the value of the running thread counter section 21d by one.

At step S32, the thread compares the value of the running thread counter section 21d with the value of the maximum running thread counter section 21e. If the value of the running thread counter section 21d is greater than that of the maximum running thread counter section 21e, the thread proceeds to step S33. At step S33, the thread updates the value of the maximum running thread counter section 21e to that of the running thread counter section 21d.

At step S34, the thread runs a program. When the program is completed, the thread proceeds to step S35.

At step S35, the thread decrements the running thread counter section 21d by one. Next, at step S36, the thread increments the value of the standby thread counter section 21c by one. At step S37, the thread queues the corresponding thread control list in the standby thread queue section 21b.

At step S38, the thread (standby thread) performs a multi-wait process. In the multi-wait process, the thread monitors the thread running ECB 24a and the thread terminating ECB 24b and waits until information is written to one of the two ECBs 24a, 24b. When information is written to the thread running ECB 24a or the thread terminating ECB 24b, the thread proceeds to step S39.

At step S39, the thread determines whether the information written in step S38 is a termination request. If the written information is not a termination request, that is, if the information is a run request, the thread proceeds to step S40. At step S40, the thread increments the standby thread counter section 21c by one. The thread then returns to step S31. As a result, the thread functions as a running thread, which runs a program, and the standby thread is recycled.

If the written information is a termination request in step S39, the thread proceeds to step S41. At step S41, the standby thread undergoes a termination process. This terminates (deletes) the standby thread.

Figure 5:
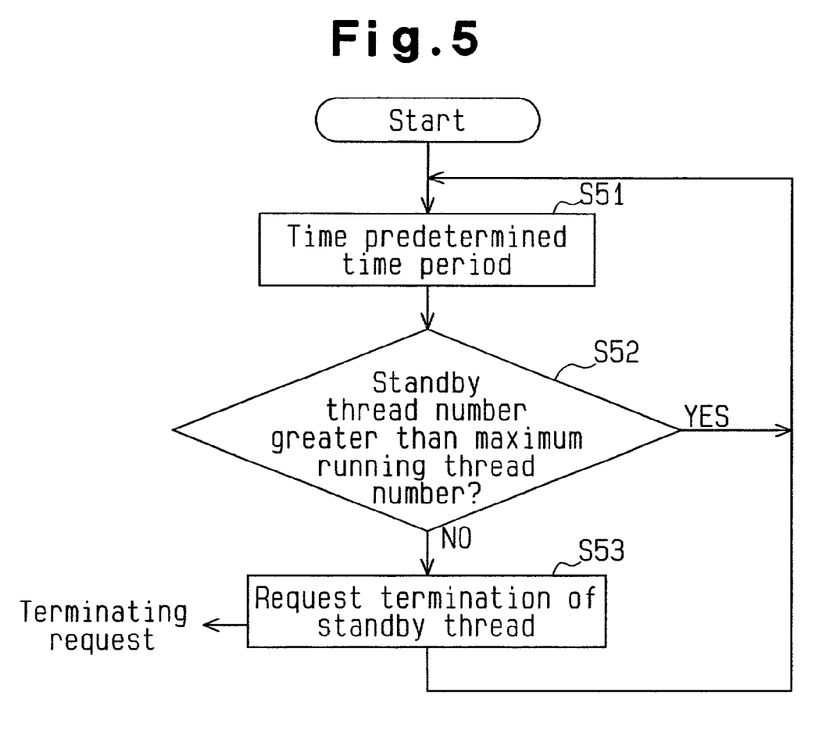
FIG. 5 is a flowchart illustrating a routine performed by a thread termination circuit of the multithreading controller of FIG. 1.

FIG. 5 is a flowchart showing a routine performed by the thread termination circuit 12.

At step S51, the thread termination circuit 12 sets a timer to time a predetermined time. The predetermined time is the time period during which the values of the standby thread counter section 21c and the maximum running thread counter section 21e is monitored. The monitoring time may be fixed in accordance with the system or varied in accordance with the operating time of the system. When the predetermined time elapses, the thread termination circuit 12 proceeds to step S52.

At step S52, the thread termination circuit 12 compares the values of the standby thread counter section 21c and the maximum running thread counter section 21e to determine whether the maximum running thread number is greater than the standby thread number. If the maximum running thread number is greater than the standby thread number, the thread termination circuit 12 returns to step S51. If the standby thread number is greater than the maximum running thread number, the thread termination circuit 12 proceeds to step S53.

At step S53, the thread termination circuit 12 requests termination of a standby thread (writes a termination request to the thread terminating ECB 24b of the thread control list corresponding to the standby thread) to terminate the standby thread and recover memory resources.

Figure 6:
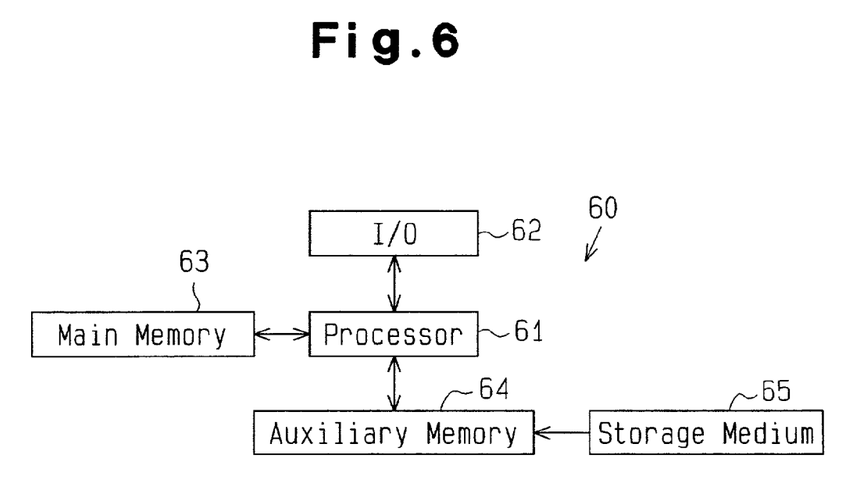
FIG. 6 is a schematic block diagram showing the hardware structure of the system.

The multithreading controller 1 may also be embodied in a computer program executed by a computer. FIG. 6 shows a computer 60, which performs multithreading to run programs in parallel. The computer 60 includes a processor 61, an input/output device 62, a main memory 63, and an auxiliary memory 64.

The computer program is stored in a portable storage medium 65, such as a floppy disk or a CD-ROM. Alternatively, the computer program may be stored in a main memory or an auxiliary memory of another network-connected computer.

The computer program is loaded to the main memory 63 of the computer 60 after the computer program is temporarily copied or installed to the auxiliary memory 64 from the storage medium 65. Alternatively, the computer program is loaded directly to the main memory 63 from the storage medium 65. Afterward, the program is executed. The thread management table 13 of FIG. 1 is generated in the main memory 63, and the thread management table 13 manages thread information.

Further, when a computer program is provided from another device that is connected to a network, the program is first received via the network from the device. The program is then either directly stored in the main memory 63 or temporarily copied or installed in the auxiliary memory 64 and then loaded to the main memory 63. Afterward, the program is run.

The devices 61–64 shown in FIG. 6 may be replaced by elements that perform the same function when the computer program is run. Further, the computer program may be used in a system having a plurality of each of the devices 61–64. Additionally, the computer program may be used in a loosely-coupled or tightly-coupled computer system.

The multithreading controller 1 has the advantages described below.

(1) The thread termination circuit 12 of the multithreading controller 1 monitors the number of running threads over a predetermined time period and compares the maximum value obtained during the time period (maximum running thread number) with the standby thread number. When the standby thread number is greater than the maximum running thread number, the surplus standby threads, the number of which exceeds the maximum running thread number, are terminated. This recovers the system resources that were used insufficiently by the standby threads and decreases the effects on the running threads of such surplus standby threads.

(2) The thread termination circuit 12 keeps a number of standby threads corresponding to the value of the maximum running thread counter section 21e, or the maximum number of standby threads corresponding to the number running threads obtained during the predetermined time, and terminates the remaining, surplus standby threads. The maximum running thread number varies in accordance with the state of the running programs, or the operational state of the system. Since the standby threads are terminated in accordance with the changes in the maximum running thread number, the necessary number of standby threads are ensured in accordance with the operational state of the system.

It should be apparent to those skilled in the art that the present invention may be embodied in many other specific forms without departing from the spirit or scope of the invention. Particularly, it should be understood that the present invention may be embodied in the following forms.

The value of the standby thread counter section 21c may be the currently necessary number of standby threads. In this case, standby threads may be terminated based on a comparison between the value of the standby thread counter section 21c and the value of the running thread counter section 21d. Alternatively, an average value of the number of the running threads during a predetermined time period may be obtained as the necessary number of standby threads. In this case, standby threads are terminated based on a comparison between the average value and the current number of running threads until the number of the standby threads decreases to the average value or the present running thread number.

The necessary number of standby threads may be obtained by multiplying the running thread number by a coefficient, which is a fixed value or a value obtained in accordance with the state of the system. In this case, standby threads are terminated until the number of standby threads decreases to the necessary number.

The thread management circuit 11 or the thread termination circuit 12 may be configured to update the value of the maximum running thread counter section (maximum running thread counter section 21e).

The present examples and embodiments are to be considered as illustrative and not restrictive, and the invention is not to be limited to the details given herein, but may be modified within the scope and equivalence of the appended claims.

What is claimed is:

1. A method for controlling a plurality of threads that perform parallel processing, comprising:
    counting a number of running threads performing parallel processing using a running thread counter and a number of standby threads that are in a standby state using a standby thread counter for a predetermined time period;
    setting a maximum number of running threads in accordance with the number of running threads during the predetermined time period using a maximum running thread counter; comparing the number of standby threads with the maximum number of running threads;
    terminating a number of standby threads exceeding the maximum number of running threads when the number of standby threads is greater than the maximum number of running threads;
    incrementing the number of running threads using the running thread counter and decrementing the number of standby threads using the standby thread counter in response to a run request; and
    updating the maximum number of running threads set by the maximum running thread counter if the incremented number of running threads is greater than the maximum number of running threads.

2. A method for controlling a plurality of threads that perform parallel processing, comprising:
    counting a number of running threads performing parallel processing using a running thread counter and a number of standby threads that are in a standby state using a standby thread counter for a predetermined time period;
    setting an average number of running threads in accordance with the number of running threads during the predetermined time period using an average running thread counter;
    comparing the number of standby threads with the average number of running threads; and
    terminating a number of standby threads exceeding the average number of running threads when the number of standby threads is greater than the average number of running threads.

3. A method for controlling a plurality of threads that perform parallel processing, comprising:
    counting a number of running threads performing parallel processing using a running thread counter and a number of standby threads that are in a standby state using a standby thread counter for a predetermined time period;
    setting a product obtained by multiplying the number of running threads during the predetermined time period by a predetermined coeficient using a product running thread counter;
    comparing the number of standby threads with the product;
    terminating a number of standby threads exceeding the product when the number of standby threads is greater than the product;
    incrementing the number of ruining threads using the running thread counter and decrementing the number of standby threads using the standby thread counter in response to a run request; and
    updating the product set by the product running thread counter if the incremented number of running threads is greater than the product.

4. A controller for controlling a plurality of threads that perform parallel processing, comprising:
    a thread management table storing thread information of the plurality of threads, wherein the thread information includes a number of running threads performing parallel processing and a number of standby threads that are in a standby state, wherein the thread management table includes
        a running thread counter to count the number of running threads,
        a standby thread counter to count the number of standby threads, and
        a maximum running thread counter;
    a thread management circuit requesting thread generation based on the number of standby threads stored in the thread management table, and requesting a standby thread to run;
    a comparison circuit setting a maximum number of running threads during a predetermined period in accordance with the number of running threads included in the thread information to the maximum running thread counter, and comparing the number of standby threads with the maximum number of running threads;
    a termination circuit terminating a number of standby threads exceeding the maximum number of running threads when the number of standby threads is greater than the maximum number of running threads; and
    a thread to cause the running thread counter to increment the number of running threads and the standby thread counter to decrement the number of standby threads in response to a run request, wherein the thread updates the maximum number of running threads set by the maximum running thread counter if the incremented number of running threads is greater than the maximum number of running threads.

5. A controller for controlling a plurality of threads that perform parallel processing, comprising:
a thread management table storing thread information of the plurality of threads, wherein the thread information includes a number of running threads performing parallel processing and a number of standby threads that are in a standby state, wherein the thread management table includes
a running thread counter to count the number of running threads,
a standby thread counter to count the number of standby threads, and
an average running thread counter;
a thread management circuit requesting thread generation based on the number of standby threads stored in the thread management table, and requesting a standby thread to run;
a comparison circuit setting an average number of running threads during a predetermined time period in accordance with the number of running threads included in the thread information to the average running thread counter, and comparing the number of standby threads with the average number of running threads;
a termination circuit terminating a number of standby threads exceeding the average number of running threads when the number of standby threads is greater than the average number of running threads; and
a thread to cause the running thread counter to increment the number of running threads and the standby thread counter to decrement the number of standby threads in response to a run request, wherein the thread updates the average number of running threads set by the average running thread counter if the incremented number of running threads is greater than the average number of running threads.

6. A controller for controlling a plurality of threads that perform parallel processing, comprising:
a thread management table storing thread information of the plurality of threads, wherein the thread information includes a number of running threads performing parallel processing and a number of standby threads that are in a standby state, wherein the thread management table includes
a running thread counter to count the number of running threads,
a standby thread counter to count the number of standby threads, and
a product running thread counter;
a thread management circuit requesting thread generation based on the number of standby threads stored in the thread management table, and requesting a standby thread to run;
a comparison circuit setting a product to the product running thread counter the product being obtained by multiplying the number of running threads during a predetermined time period by a predetermined coefficient in accordance with the number of running threads included in the thread information, and comparing the number of standby threads with the product;
a termination circuit terminating a number of standby threads exceeding the product when the number of standby threads is greater than the product; and
a thread to cause the running thread counter to increment the number of running threads and the standby thread counter to decrement the number of standby threads in response to a run request, wherein the thread updates the product set by the product running thread counter if the incremented number of running threads is greater than the product.

7. A computer readable storage medium storing a program for controlling at least one processor to execute a plurality of threads that perform parallel processing, according to a method comprising:
counting a number of running threads performing parallel processing using a running thread counter and a number of standby threads that are in a standby state using a standby thread counter for a predetermined time period;
setting a maximum number of running threads in accordance with the number of running threads during the predetermined time period using a maximum running thread counter;
comparing the number of standby threads with the maximum number of running threads;
terminating an amount of the standby threads exceeding the maximum number of running threads when the number of standby threads is greater than the maximum number of running threads;
incrementing the number of running threads using the running thread counter and decrementing the number of standby threads using the standby thread counter in response to a run request; and
updating the maximum number of running threads set by the maximum running thread counter if the incremented number of running threads is greater than the maximum number of running threads.

8. A computer readable storage medium storing a program for controlling at least one processor to execute a plurality of threads that perform parallel processing, according to a method comprising:
counting a number of running threads performing parallel processing using a running thread counter and a number of standby threads that are in a standby state using a standby thread counter for a predetermined time period;
setting an average number of running threads in accordance with the number of running threads during the predetermined time period using an average running thread counter;
comparing the number of standby threads with the average number of running threads;
terminating an amount of the standby threads exceeding the average number of running threads when the number of standby threads is greater than the average number of running threads;
incrementing the number of running threads using the running thread counter and decrementing the number of standby threads using the standby thread counter in response to a run request; and
updating the average number of running threads set by the average running thread counter if the incremented number of running threads is greater than the average number of running threads.

9. A computer readable storage medium storing a program for controlling at least one processor to execute a plurality of threads that perform parallel processing, according to a method comprising:
counting a number of running threads performing parallel processing using a running thread counter and a number of standby threads that are in a standby state using a standby thread counter for a predetermined time period;

setting a product obtained by multiplying the number of running threads during the predetermined time period by a predetermined coeficient using a product running thread counter;

comparing the number of standby threads with the product;

terminating an amount of the standby threads exceeding the product when the number of standby threads is greater than the product;

incrementing the number of running threads using the running thread counter and decrementing the number of standby threads using the standby thread counter in response to a run request; and updating the product set by the product running thread counter if the incremented number of running threads is greater than the product.

* * * * *

UNITED STATES PATENT AND TRADEMARK OFFICE
CERTIFICATE OF CORRECTION

PATENT NO.       : 7,137,115 B2                                             Page 1 of 1
APPLICATION NO.  : 09/748862
DATED            : November 14, 2006
INVENTOR(S)      : Satoshi Sakamoto et al.

It is certified that error appears in the above-identified patent and that said Letters Patent is hereby corrected as shown below:

Column 8, Line 20, change "coeficient" to --coefficient--.

Column 9, Line 56, after "counter" insert --,--.

Column 11, Line 3, change "coeficient" to --coefficient--.

Signed and Sealed this

Eighth Day of May, 2007

JON W. DUDAS
*Director of the United States Patent and Trademark Office*